(12) United States Patent
Perry et al.

(10) Patent No.: US 6,570,268 B1
(45) Date of Patent: May 27, 2003

(54) SYNCHRONOUS RECTIFIER DRIVE CIRCUIT AND POWER SUPPLY INCLUDING SAME

(75) Inventors: Marty Perry, Tucson, AZ (US); Ian Poynton, Marana, AZ (US)

(73) Assignee: Artesyn Technologies, Inc., Boca Raton, FL (US)

( * ) Notice: Subject to any disclaimer, the term of this patent is extended or adjusted under 35 U.S.C. 154(b) by 52 days.

(21) Appl. No.: 09/716,506

(22) Filed: Nov. 20, 2000

(51) Int. Cl.⁷ .................................................. H02J 1/00
(52) U.S. Cl. ........................................................ 307/38
(58) Field of Search .............................. 307/38, 39, 40, 307/31

(56) References Cited

U.S. PATENT DOCUMENTS

| | | | | |
|---|---|---|---|---|
| 5,625,541 A | * | 4/1997 | Rozman | 327/309 |
| 5,663,877 A | * | 9/1997 | Dittli et al. | 363/127 |
| 5,999,417 A | | 12/1999 | Schlecht | |
| 6,011,703 A | | 1/2000 | Boylan et al. | |
| 6,069,804 A | | 5/2000 | Ingman et al. | |
| 6,188,592 B1 | | 2/2001 | Farrington et al. | |
| 6,297,970 B2 | * | 10/2001 | Hemena et al. | 363/127 |
| 6,330,169 B2 | * | 12/2001 | Mullett et al. | 363/16 |
| 6,342,737 B1 | * | 1/2002 | Brodeur | 307/87 |

* cited by examiner

Primary Examiner—Shawn Riley
(74) Attorney, Agent, or Firm—Kirkpatrick & Lockhart LLP (57) ABSTRACT

A dual output power converter, including a transformer having first and second secondary windings, a first synchronous rectifier coupled to the first secondary winding of the transformer for converting an alternating voltage at the first secondary winding to a first DC output voltage, a second synchronous rectifier coupled to the second secondary winding of the transformer for converting an alternating voltage at the second secondary winding to a second DC output voltage, and a drive circuit coupled to each of the first and second synchronous rectifiers for turning on the first and second synchronous rectifiers when the alternating voltage at the first and second secondary windings transition from a first polarity to a second polarity, and for turning off the first and second synchronous rectifiers when the alternating voltage at the first and second secondary windings transition from the second polarity to the first polarity.

12 Claims, 8 Drawing Sheets

SYNCHRONOUS RECTIFIER DRIVE CIRCUIT AND POWER SUPPLY INCLUDING SAME

CROSS-REFERENCE TO RELATED APPLICATIONS

Not Applicable.

STATEMENT REGARDING FEDERALLY SPONSORED RESEARCH AND DEVELOPMENT

Not Applicable.

BACKGROUND OF INVENTION

1. Field of Invention

The present invention relates generally to electronics and, more particularly, to synchronous rectifier drive circuits.

2. Description of the Background

DC-to-DC power converters are power processing circuits which convert an unregulated input DC voltage to a regulated DC output voltage. Switched-mode DC-to-DC power converters typically include an inverter, a transformer having a primary winding coupled to the inverter, and a rectifying circuit coupled to a secondary winding of the transformer. The inverter typically includes a switching device, such as a field effect transistor (FET), that converts the DC input voltage to an alternating voltage, which is magnetically coupled from the primary winding of the transformer to the secondary winding. The rectifying circuit rectifies the alternating voltage on the secondary winding to generate a desired DC output voltage.

It is known to use synchronous rectifiers (SRs) employing metal-oxide-semiconductor field effect transistors (MOSFETs) to convert the alternating voltage of the secondary winding to the unipolar DC output voltage. The advantage of synchronous rectification is that the forward voltage drop, and hence the power loss, across a MOSFET SR is much less than that of diode devices used in the rectifying circuit. Such SR circuits, however, typically require gate drive circuitry to render the MOSFET at a low resistance during forward conduction and, more importantly, to render it non-conductive during reverse bias. This is because, unlike a diode, a SR may be conductive in both directions (i.e., forward and reverse). Thus, if not properly controlled, reverse current can flow through a MOSFET SR, thereby negatively affecting the efficiency of the power converter.

One known technique to control the gate drive of a MOSFET SR is to couple the alternating voltage from the secondary winding of the transformer to the gate terminal of the MOSFET SR to thereby turn the device on and off in response to the voltage across the secondary winding. This scheme is commonly referred to as "self-driven synchronous rectification." Although usually effective, it is possible that when the voltage on the secondary winding reverses and the gate terminal of the SR is driven off, a delay in turn-off of the SR will provide a period of reverse current in the SR. This has a deleterious "shorting" effect on the secondary winding which may limit the turn off voltage and further delay commutation of the SR. Additionally, it is difficult to generate the proper on-state SR bias level in the self-driven configuration.

One known technique to overcome the shortcomings of self-driven synchronous rectifiers is to employ a gate drive circuit coupled to the control terminal of the synchronous rectifier. Control-driven gate drive circuits, however, are complicated to implement. In addition, it is difficult to implement a gate drive circuit driven by the alternating voltage of the transformer that is capable of driving two synchronous rectifiers of a dual output power converter or provide the proper bias levels in low voltage output converters.

Accordingly, there exists a need in the prior art for a manner in which to reduce, and even obviate, the delay in turn-off of a SR, to thereby minimize, or eliminate, any period of reverse conduction of the SR and the subsequent shorting effect. There further exists a need for a gate drive circuit that can efficiently and effectively drive the synchronous rectifiers for a dual output converter. Still further there exists a need for a gate drive circuit that is capable of providing the required SR bias level in low output converters.

SUMMARY OF THE INVENTION

According to one embodiment, the present invention is directed to a dual output power converter. The dual output power converter includes a transformer having first and second secondary windings, a first synchronous rectifier coupled to the first secondary winding of the transformer for converting an alternating voltage at the first secondary winding to a first DC output voltage, a second synchronous rectifier coupled to the second secondary winding of the transformer for converting an alternating voltage at the second secondary winding to a second DC output voltage, and a drive circuit coupled to each of the first and second synchronous rectifiers for turning on the first and second synchronous rectifiers when the alternating voltage at the first and second secondary windings transition from a first polarity to a second polarity, and for turning off the first and second synchronous rectifiers when the alternating voltage at the first and second secondary windings transition from the second polarity to the first polarity.

According to another embodiment, the present invention is directed to a drive circuit for a synchronous rectifier, wherein the synchronous rectifier is for converting an alternating voltage to a DC voltage. The drive circuit includes a first switch for supplying a drive current to a control terminal of the synchronous rectifier when the when the alternating voltage is at a first polarity, a second switch for shunting the drive current from the control terminal of the synchronous rectifier when the alternating voltage transitions from the first polarity to a second polarity, a pulse transformer having a primary winding and a secondary winding, wherein the primary winding is responsive to a condition causing transitions of the alternating voltage between the first and second polarities, and wherein conduction of the second switch is controlled by a voltage across the secondary winding of the pulse transformer, and a differentiator circuit coupled to the pulse transformer.

According to another embodiment, the present invention is directed to a power supply with parallel-connected converters having a cross-coupled charge pump arrangement. The power supply includes: a first converter including a first transformer, a first synchronous rectifier for converting an alternating voltage at a secondary winding of the first transformer to a first DC voltage, a first drive circuit coupled to the first synchronous rectifier for turning on the first synchronous rectifier when an alternating voltage at the secondary winding of the first transformer transitions from a first polarity to a second polarity, and a first charge pump coupled to the secondary winding of the first transformer; and a second converter connected in parallel with the first converter, wherein the second converter includes a second transformer a second synchronous rectifier for converting an alternating voltage at a secondary winding of the second transformer to a second DC voltage, a second drive circuit coupled to the second synchronous rectifier for turning on the second synchronous rectifier when an alternating voltage at the secondary winding of the second transformer transitions from a first polarity to a second polarity, and a second charge pump coupled to the secondary winding of the second transformer, wherein the first charge pump is for turning on the second synchronous rectifier when the alternating voltage at the secondary winding of the second transformer transitions from the second polarity to the first polarity, and wherein the second charge pump is for turning on the first synchronous rectifier when the alternating voltage at the secondary winding of the first transformer transitions from the second polarity to the first polarity.

The present invention provides an advantage over prior art self-driven synchronous rectification schemes because it provides a manner for eliminating delay in the turn-off of a synchronous rectifier, thus providing the advantage of eliminating the shorting effect of the secondary winding of the transformer. Embodiments of the present invention also provide the advantage of having a mechanized synchronous rectifier turn-on system operable at, for example, low output voltages. These and other benefits of the present invention will be evident from the detailed description hereinbelow.

DESCRIPTION OF THE FIGURES

For the present invention to be clearly understood and readily practiced, the present invention will be described in conjunction with the following figures, wherein.

DETAILED DESCRIPTION OF THE INVENTION

Figure 1:
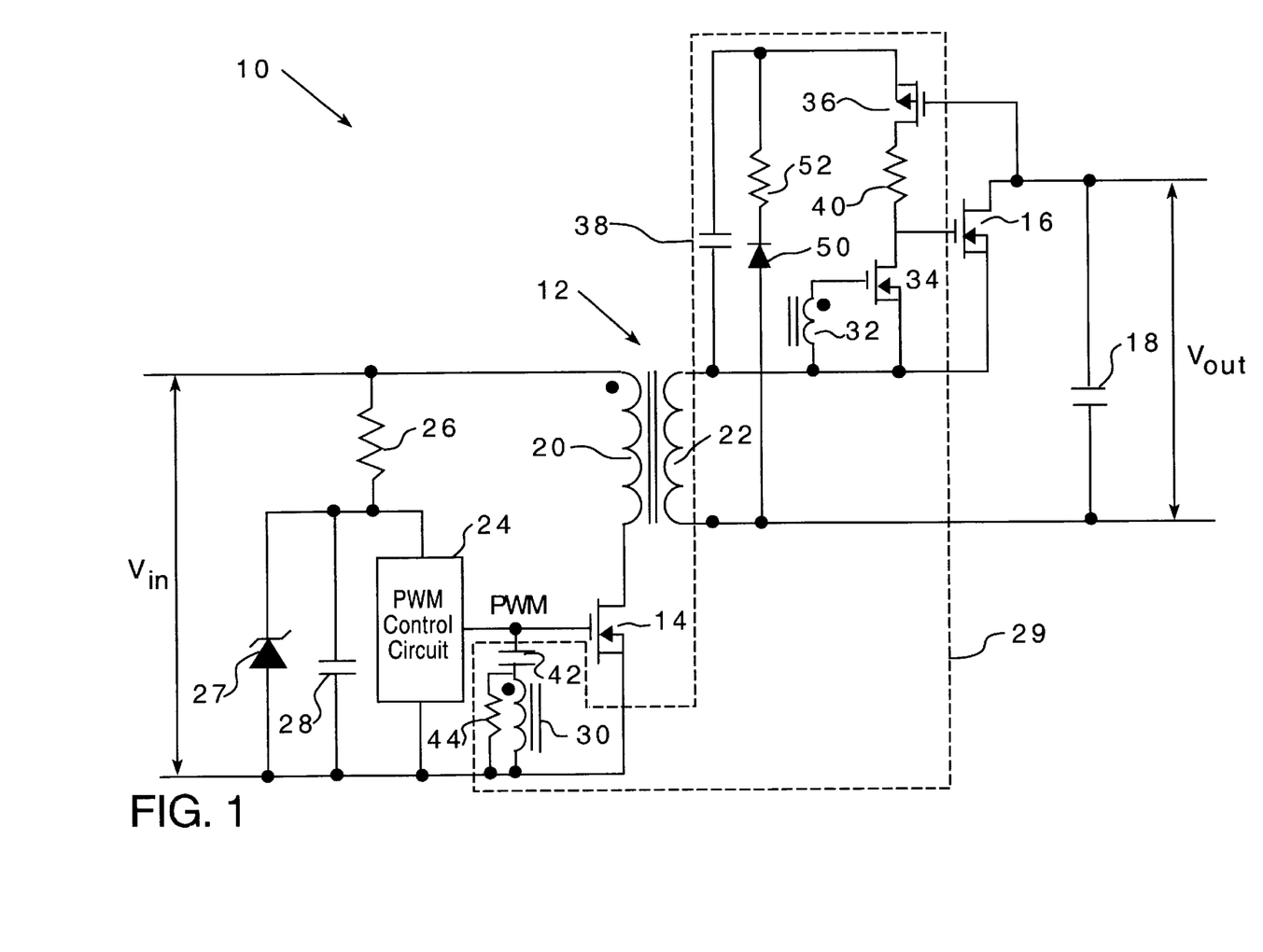
FIG. 1 is a schematic diagram of a power converter circuit according to one embodiment of the present invention.

FIG. 1 is a schematic diagram of a power converter circuit 10 according to one embodiment of the present invention. The power converter circuit 10 includes an isolation transformer 12, a primary power switch 14, a synchronous rectifier (SR) 16, and an output capacitor 18. The SR may be, for example, a MOSFET, such as an n-channel MOSFET as illustrated in FIG. 1. The isolation transformer includes a primary winding 20 and a secondary winding 22. The primary power switch 14 may be, for example, a transistor, such as an n-channel MOSFET as illustrated in FIG. 1. The primary power switch 14 cyclically couples the input voltage ($V_{in}$) from a voltage source (not shown) to the primary winding 20 of the transformer 12 to generate an alternating voltage at the secondary winding 22. This alternating voltage is converted to a DC voltage by the SR 16, producing a filtered DC output voltage ($V_{out}$) across the output capacitor 18, which is used to power a load (not shown).

The duty cycle of the primary power switch 14 is controlled by a pulse width modulated (PWM) signal output from a PWM control circuit 24. When the primary power switch 14 is closed, i.e., when the PWM signal drives the primary power switch 14 into conduction, the input voltage $V_{in}$ is coupled to the primary winding 20, causing current in the primary winding 20 to increase linearly and causing energy to be stored within the transformer 12. During this time period, the SR 16 is non-conductive, as described further hereinbelow, and the output capacitor 18 supplies the load current. Accordingly, the output capacitor 18 may be chosen to have a capacitance large enough in order that it provides sufficient load current during the period that the SR 16 is non-conductive.

When the primary power switch 14 is opened, i.e., when the PWM signal drives the primary switch 14 into non-conduction, the energy stored in the transformer 12 is transferred to the secondary of the power converter circuit 10. The SR 16 is turned on, as discussed hereinbelow, causing load current to flow through the SR 16. The secondary current of the power converter 10, i.e., the forward current through the SR 16, decreases linearly until this interval terminates as determined by the particular operating point of the converter 10.

Accordingly, by regulating the duty cycle of the PMW signal, the output voltage $V_{out}$ may be controlled. According to one embodiment, the PWM control circuit 24 may be responsive to the output voltage $V_{out}$ and regulate the PWM signal based on the output voltage $V_{out}$ to realize a desired output. As illustrated in FIG. 1, the PWM control circuit 24 may receive power from the input voltage $V_{in}$ via a resistor 26, which may be regulated by a Zener diode 27 and filtered by a capacitor 28.

Conduction of the SR 16 is controlled by a gate drive circuit 29. According to one embodiment, as illustrated in FIG. 1, the gate drive circuit 29 includes a pulse transformer, having a primary winding 30 magnetically coupled to a second winding 32, but which are shown detached in FIG. 1 for clarity. The gate drive circuit 29 also includes a switch 34 and a switch 36. Both switches 34, 36 may be transistors such as, for example, MOSFETs. According to one embodiment, as illustrated in FIG. 1, the switch 34 may be an n-channel MOSFET and the switch 36 may be a p-channel MOSFET.

The switch 34 may provide a conduction path between the secondary winding 22 of the isolation transformer 12 and the gate terminal of the SR 16. In addition, the control terminal of the switch 34 may be coupled to the secondary winding 32 of the pulse transformer. The switch 36 may also provide a conduction path between the secondary winding 22 of the isolation transformer 12 and the gate terminal of the SR 16, although a capacitor 38 may be provided between the secondary winding 22 and the switch 36, and a resistor 40 may be provided between the switch 36 and the gate terminal of the SR 16. The control terminal of the switch 36 may be coupled to the drain terminal of the SR MOSFET 16.

The primary winding 30 of the pulse transformer may be pulsed with the PWM signal from the PWM control circuit 24 via a capacitor 42. In addition, a resistor 44 may be shunt loaded with the primary winding 30. The capacitor 42 and resistor 44 may form a differentiator circuit, discussed further hereinbelow.

Figure 2A:
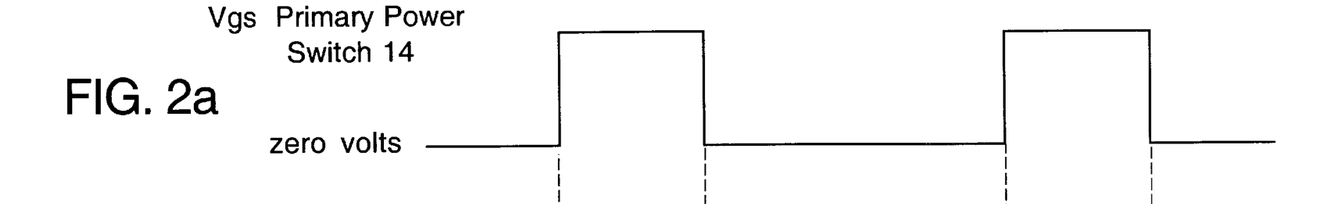
FIGS. 2a–c are voltage waveform diagrams illustrating the operation of the power converter circuit of FIG. 1 according to one embodiment of the present invention.
Figure 2B:
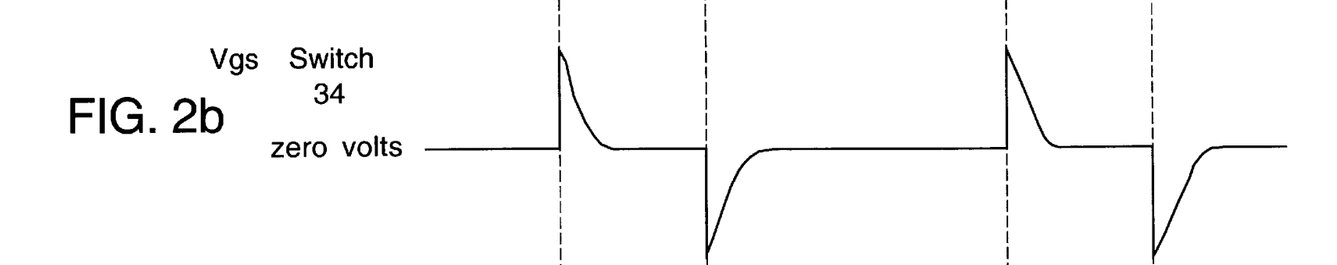
Figure 2C:
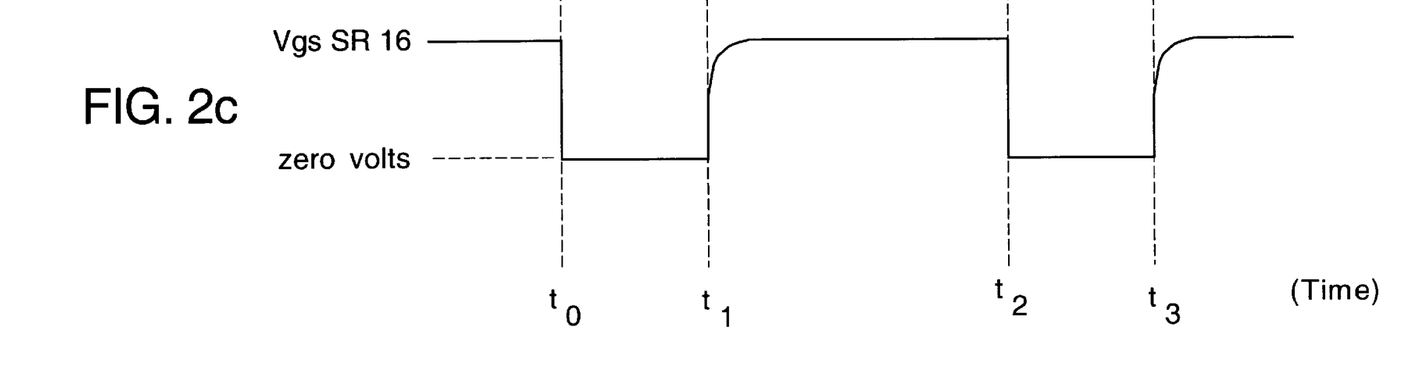

The operation of the gate drive circuit 29 of FIG. 1 will be discussed in conjunction with the idealized voltage waveform diagrams of FIGS. 2a–c. FIG. 2a is a diagram showing the gate-source voltage of the primary power switch 14. FIG. 2b is a diagram showing the gate-source voltage of the switch 34. FIG. 2c is a diagram showing the gate-source voltage of the SR 16. The duty cycle of the PWM signal is $(t_1-t_0)/(t_3-t_0)$.

According to one embodiment, when the primary power switch 14 is closed, the capacitor 38 is charged to $V_{in}/N$, where N is the turns ratio of the transformer 12. When the primary power switch 14 is opened at $t_1$, the polarity of the voltage at the secondary winding 22 of the transformer 12 will reverse. This will forward bias the intrinsic body diode of the SR 16 and cause the switch 36 to conduct, thereby driving the gate terminal of the SR 16 to turn on the SR 16.

When the primary power switch 14 is then turned on at $t_2$ by the PWM signal of the PWM control circuit 24, the PWM signal is differentiated by the differentiator circuit comprising the capacitor 42 and the resistor 44, and the differentiated PWM signal is applied to the primary winding 30 of the pulse transformer. The switch 34 is therefore instantaneously turned on by the voltage across the secondary winding 32 of the pulse transformer. The turning-on of the switch 34 turns off the SR 16 and shunts drive current from the switch 36, limited by the resistor 40, away from the gate terminal of the SR 16. In this interval, the primary power switch 14 turns on, causing the voltage on the primary winding 20 of the isolation transformer 12 to reverse.

Subsequently, the voltage at the secondary winding 22 reverses, and because the SR 16 has been turned off, the possibility of reverse current through the SR 16 is eliminated and shorting of the secondary winding 22 is prevented. As reverse voltage appears across the SR 16, the switch 36 may be turned off, thus removing the drive current from the gate terminal of the SR 16 and limiting further dissipation in the resistor 40. With the switch 36 turned off, no drive is available for the SR 16, and the switch 34 is turned off by the decay of the differential pulse at its gate terminal.

The values of the capacitor 42 and the resistor 44 of the differentiator circuit may be chosen such that the differential time constant provided by the differentiator circuit is long enough to keep the switch 34 turned on during the switching interval, but short enough to significantly reduce the volt-second product applied across the pulse transformer.

According to one embodiment, as illustrated in FIG. 1, power for the gate drive circuit 29 may be derived from the secondary winding 22 of the isolation transformer 12 through a diode 50 and a resistor 52. Drive energy may be stored in the capacitor 38, allowing the on-time of the SR 16 to be non-responsive to the magnitude of the voltage at the secondary winding 22. Consequently, in contrast to prior art self-driven synchronous rectification schemes, the present invention does not use the secondary voltage to directly drive the SR 16. According to another embodiment, a bias voltage supply may be used to provide steady drive power to the SR 16.

Figure 3:
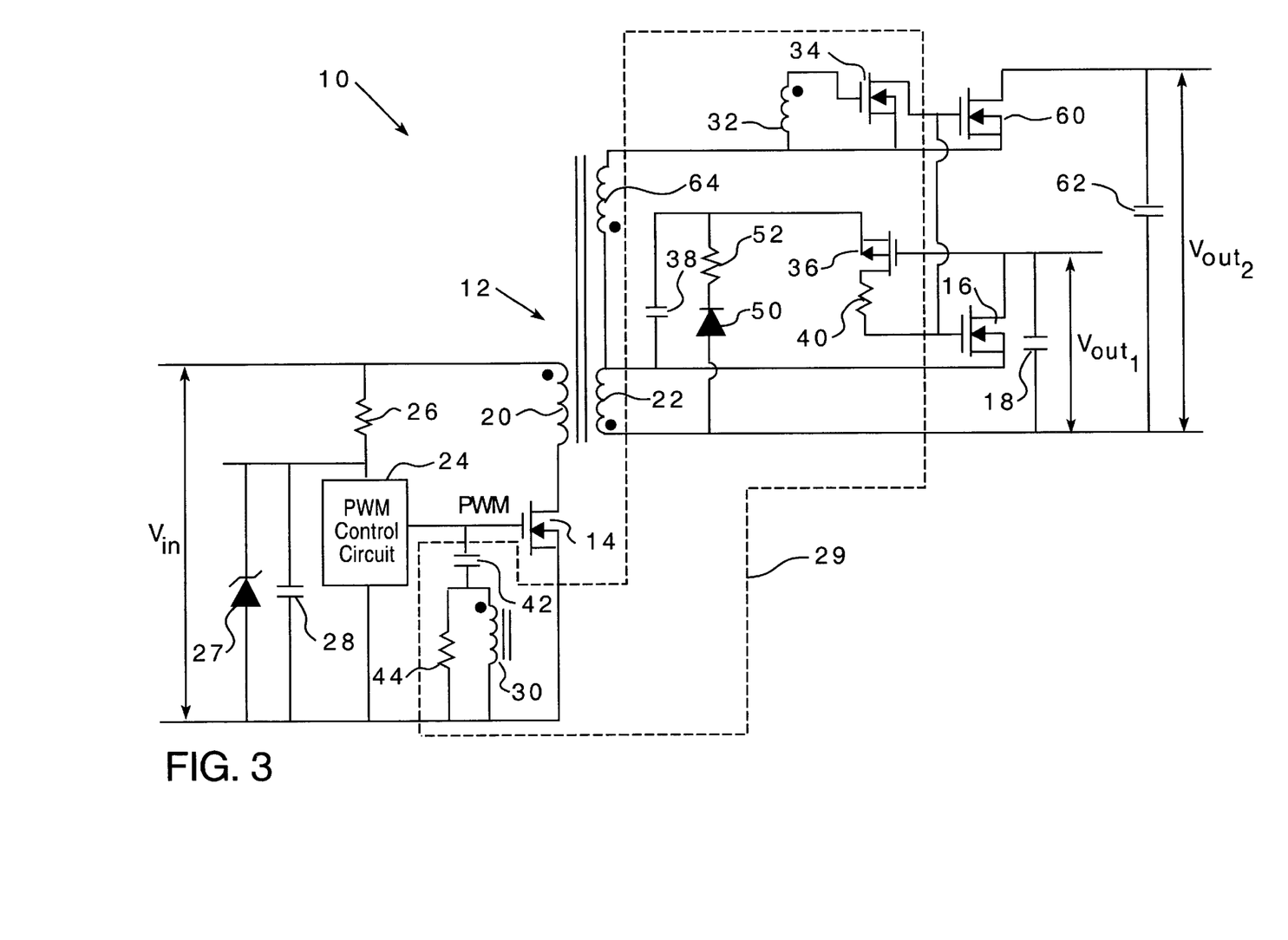
FIG. 3 is a schematic diagram of a power converter circuit according to another embodiment of the present invention.

FIG. 3 is a schematic diagram of the power converter circuit 10 according to another embodiment of the present invention. The power converter circuit 10 illustrated in FIG. 10 is similar to that of FIG. 1, except that it provides a dual output ($V_{out1}$ and $V_{out2}$). The illustrated embodiment includes a second SR 60 and a second output capacitor 62. In addition, the transformer 12 may include a second secondary winding 64. The second SR 60 may be, for example, a MOSFET, as illustrated in FIG. 3.

The cycling switching of the primary power switch 14 additionally generates an alternating voltage across the secondary windings 64. This alternating voltage is converted to a DC voltage by the second SR 60, producing a filtered DC output voltage ($V_{out2}$) across the output capacitor 62 to power a second load (not shown).

The gate drive circuit 29 described hereinbefore may drive each of the SRs 16, 60. According to such an embodiment, the gate terminal of the second SR 60 may be coupled to the gate terminal of the first SR 16. Consequently, as described hereinbefore with respect to FIGS. 1 and 2, as a reverse voltage appears across the SR 60 due to the polarity of the second secondary winding 64, the switch 36 may be turned off, thus removing the drive current from the gate terminal of the SR 60. With the switch 36 turned off, no drive is available for the SR 60, and the switch 34 is turned off by the decay of the differential pulse at its gate terminal.

Figure 4:
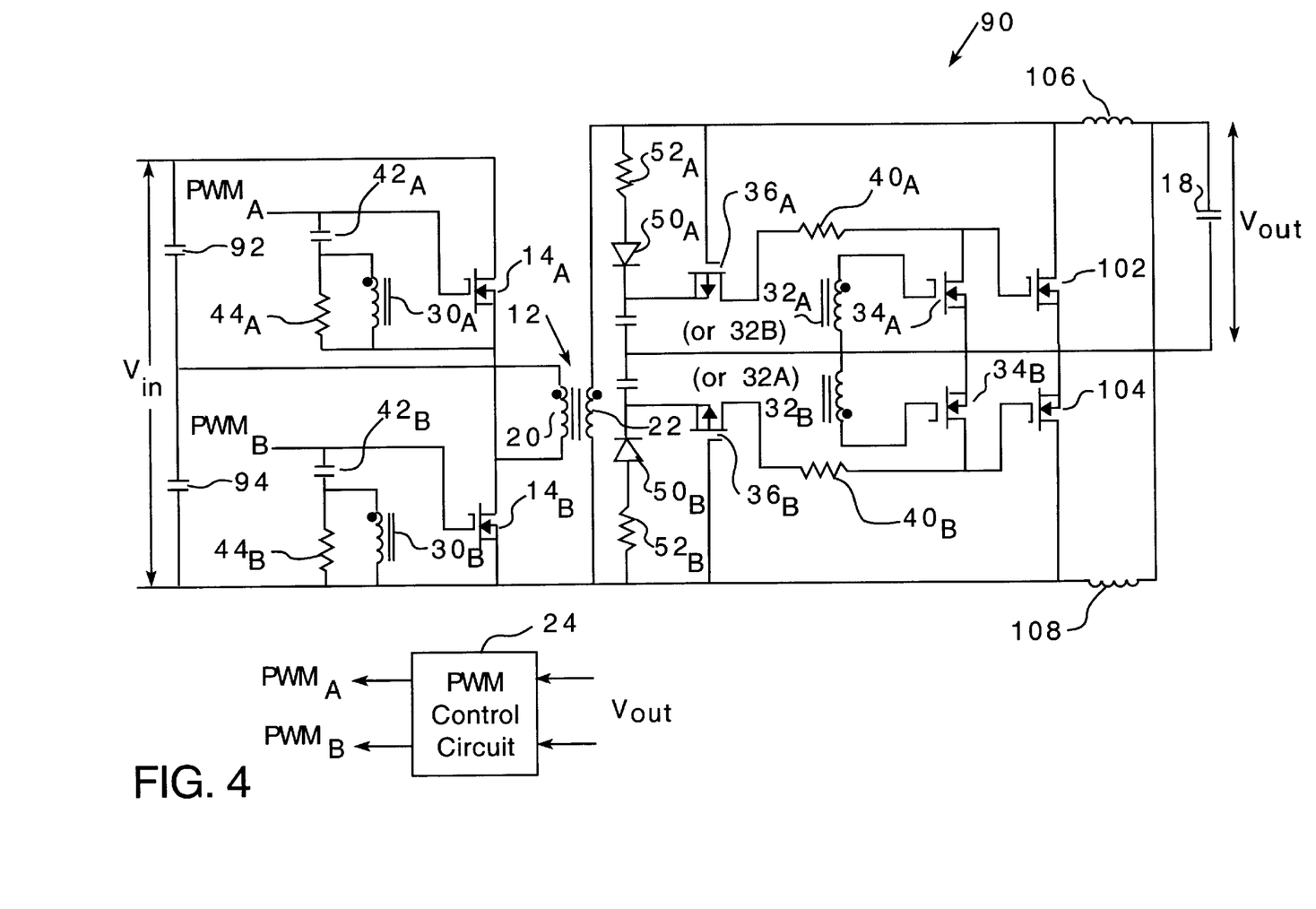
FIG. 4 is a schematic diagram of a power converter circuit according to another embodiment of the present invention.

The power converter circuit 10 of FIGS. 1 and 3 utilizes a flyback topology. Benefits of the gate drive circuit 29 of the present invention, however, may be realized with other types of power conversion topologies. For example, FIG. 4 is a schematic diagram of a half-bridge power converter circuit 90 with a current doubler including a gate drive circuit according to an embodiment of the present invention. The circuit 90 includes two series-connected capacitors 92, 94 connected across the input voltage source ($V_{in}$). The primary winding 20 of the isolation transformer 12 may be coupled between a common node the two capacitors 92, 94 and a common node of the two primary input power switches $14_A$, $14_B$.

The secondary of the circuit 90 includes two SRs 102, 104, which may be, for example, MOSFETs as illustrated in FIG. 4. The SRs 102, 104 may alternately convert an alternating voltage across the secondary winding 22 of the isolation transformer 12 to produce a regulated DC output voltage. $V_{out}$ across the output capacitor 18. A pair of output inductors 106, 108, in conjunction with the output capacitor 18, may filter the DC voltages generated by the SRs 102, 104.

The illustrated half-bridge power converter circuit 90 includes two gate drive circuits to respectively control the drive supplied to each of the SRs 102, 104. Similar to the gate drive circuits described hereinbefore, the first gate drive circuit of circuit 90, which controls the gate drive for the first SR 102, may include a pulse transformer including a primary winding $30_A$ and a secondary winding $32_A$. The first gate drive circuit may also include first and second switches $34_A$ and $36_A$ coupled by a resistor $40_A$. In addition, as discussed hereinbefore, a differentiator circuit comprising a capacitor $42_A$ and a resistor $44_A$ may differentiate a first PWM signal, $PWM_A$, which controls the switching of the first primary power switch $14_A$.

Similarly, the second gate drive circuit, which controls the drive supplied to the second SR 104, may include a second pulse transformer including a primary winding $30_B$ and a secondary winding $32_B$, a pair of switches $34_B$ and $36_B$ coupled by a resistor $40_B$, and a differentiator circuit comprising a capacitor $42_B$ and a resistor $44_B$.

In a manner analogous to that described hereinbefore with respect to FIGS. 1 and 2, the first and second drive circuits may respectively prevent the SRs 102, 104 from conducting reverse current, thereby preventing the shorting effect of the secondary winding 22, except that for a half-bridge configuration, as illustrated in FIG. 4, the SRs 102, 104 may be turned off only during the interval that the opposite primary power switches $14_A$, $14_B$ are turned on. That is, the SR 102 may be turned off only for the interval that primary power switch $14_B$ is turned on, and the SR 104 may be turned off only for the interval that primary power switch $14_A$ is turned on. This may be realized in the half-bridge circuit 90 because the secondary winding 22 of the isolation transformer 12 has the same polarity as the primary winding 20.

Power for each of the gate drive circuits may be derived from the secondary winding 22 of the isolation transformer 12, for the first gate drive circuit, through a diode $50_A$ and a resistor $52_A$, and for the second gate drive circuit, through a diode $50_B$ and a resistor $50_B$.

Figure 5:
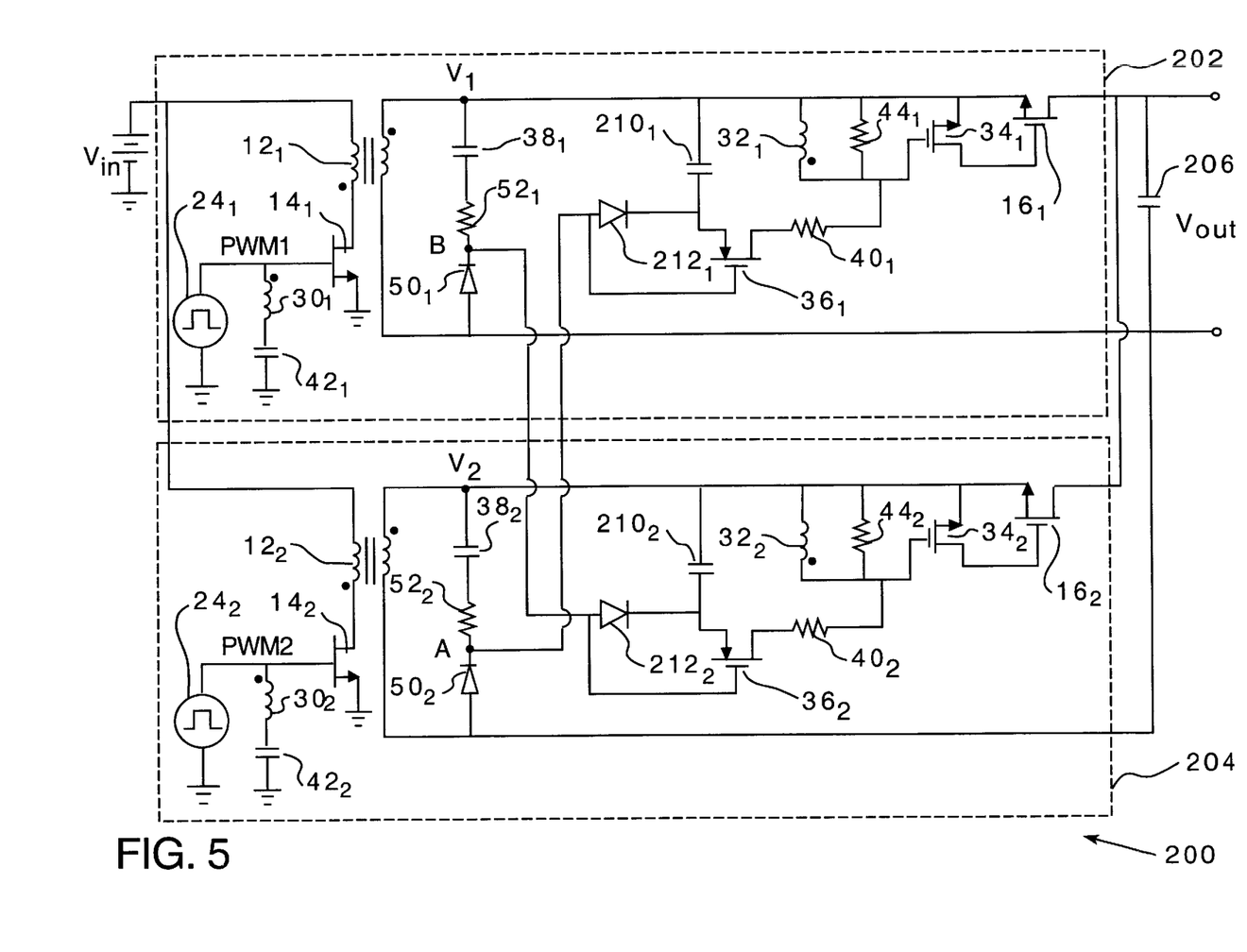
FIG. 5 is a schematic diagram of a power supply according to another embodiment of the present invention.

FIG. 5 is a diagram of a power supply 200 according to another embodiment of the present invention. The power supply 200 illustrated in FIG. 5 includes two parallel-connected converters 202, 204. The converters 202, 204 may be, for example, flyback converters sharing a common output capacitor 206. Each converter 202, 204 may be similar to the converter 10 described hereinbefore with respect to FIG. 1, including an isolation transformer $12_{1-2}$, a primary power switch $14_{1-2}$, a synchronous rectifier $16_{1-2}$, and a PWM control circuit $24_{1-2}$. The PWM signals PWM1 and PWM2 from the respective PWM control circuits $24_{1-2}$ may be, for example, 180 degrees out of phase such that the parallel-connected converters 202, 204 operate in an interleaved mode.

Similarly, each converter 202, 204 may include a gate drive circuit as described hereinbefore including, for example, a pulse transformer including a primary winding $30_{1-2}$ and a secondary winding $32_{1-2}$, a differential circuit including a capacitor $42_{1-2}$ and a resistor $44_{1-2}$ (in FIG. 5 the resistors $44_{1-2}$ are shown in parallel across the secondary windings $30_{1-2}$ of the pulse transformers), switches $34_{1-2}$, $36_{1-2}$, and a resistor $40_{1-2}$. In addition, each converter 202, 204 may include a capacitor $38_{1-2}$, a resistor $52_{1-2}$, and a diode $50_{1-2}$ connected across the secondary winding of the isolation transformer $12_{1-2}$.

In contrast to the converter 10 described hereinbefore, the turn-on function for the synchronous rectifiers $16_{1-2}$ of the converters 202, 204 may be mechanized by use of a cross-coupled charge pump arrangement. According to one such embodiment, each converter 202, 204 may include a capacitor $210_{1-2}$ and a diode $212_{1-2}$. The diode $212_1$ may be connected between the diode $50_2$ and the source terminal of the switch $36_1$. The capacitor $210_1$ may be connected between the source terminal of the switch $36_1$ and the secondary winding of the transformer $12_1$. The gate terminal of the switch $36_1$ may also be connected to the diode $50_2$.

Similarly, the diode $212_2$ may be connected between the diode $50_1$ and the source terminal of the switch $36_2$, and the capacitor $210_2$ may be connected between the source terminal of the switch $36_2$ and the secondary winding of the transformer $12_2$. The gate terminal of the switch $36_2$ may also be connected to the diode $50_1$.

The charge pump for the synchronous rectifier $16_1$ of the converter 202 may include the capacitors $38_2$, $210_1$, the diodes $50_2$, $212_1$, and the resistor $52_2$. Similarly, the charge pump for the synchronous rectifier $16_2$ of the converter 204 may include the capacitors $38_1$, $210_2$, the diodes $50_1$, $212_2$, and the resistor $52_1$. The resistors $52_{1-2}$ may provide a current limit function during the charge pump conversion intervals.

The power supply 200 of FIG. 5 may be beneficial, for example, for low output voltage applications. For example, for a low output voltage converter, the turns ratio of the isolation transformers may be sufficiently high that the appropriate drive level to forward bias the synchronous rectifier cannot be developed for all input voltage conditions of Vin. As described hereinbelow, the cross-coupled charge pump arrangement may yield the required synchronous rectifier drive levels and gating functions when using high step-down ratios as are ordinarily required for optimized low voltage output converters.

Figure 6A:
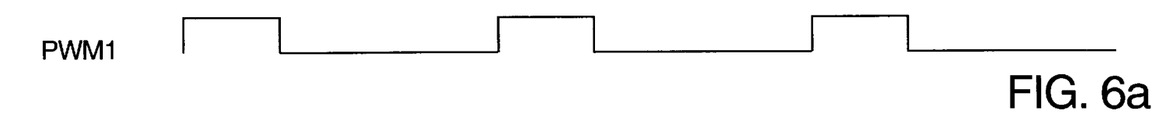
FIGS. 6a–f are voltage waveform diagrams illustrating the operation of the power supply of FIG. 5 according to one embodiment of the present invention.
Figure 6B:
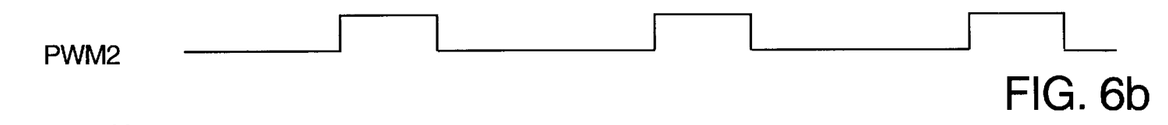
Figure 6C:
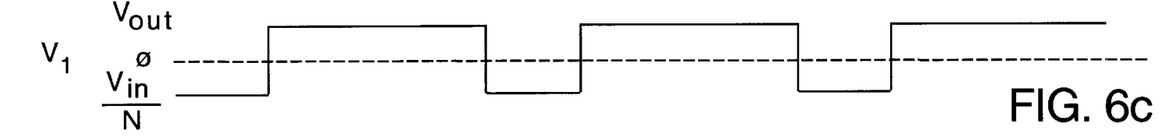
Figure 6D:
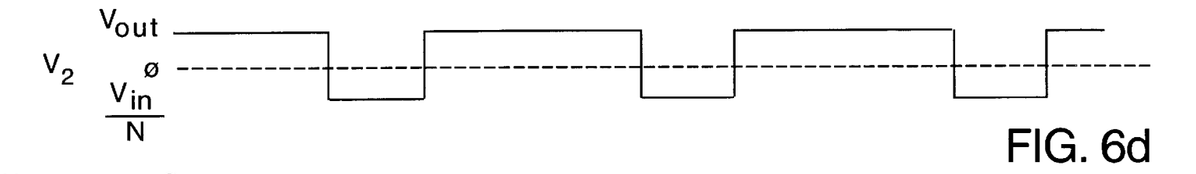
Figure 6E:
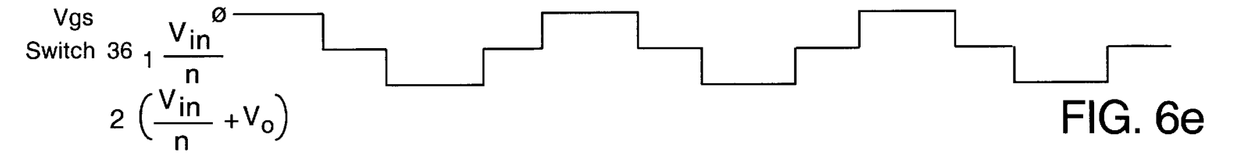
Figure 6F:
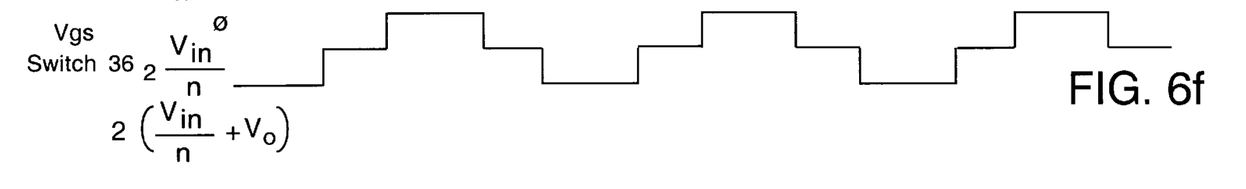

FIGS. 6a–f illustrate idealized voltage waveforms for the power supply 200 at an arbitrary operating point. FIG. 6a is a diagram of the PWM signal from the first PWM control circuit $24_1$ (PWM1). FIG. 6b is a diagram of the PWM signal from the second PWM control circuit $24_2$ (PWM2). FIG. 6c is a diagram of the voltage at a node ($V_1$) in the converter 202 between the capacitor $38_1$ and the secondary winding of the transformer $12_1$. FIG. 6d is a diagram of the voltage at a node ($V_2$) in the converter 204 between the capacitor $38_2$ and the secondary winding of the transformer $12_2$. FIG. 6e is a diagram of the gate-source voltage of the transistor $36_1$. And FIG. 6f is a diagram of the gate-source voltage of the transistor $36_2$.

From FIGS. 6a–f, it is recognized than when the signal PWM2 is high, the capacitor $38_2$ is charged to a voltage of Vin/N, where N is the turns ratio of the transformers $12_{1-2}$. Subsequently, the signal PWM2 goes low prior to the signal PWM1 going high. This causes the voltage at the node "A" of the converter 204 to become $(V_{in}/N)+V_{out}$. When the signal PWM1 goes high, the capacitor $210_1$ is charged via the capacitor $38_2$, the diode $212_1$ and the transformer $12_1$ to a value of $(2V_{in}/N)+V_{out}$. By appropriate selection of these values, this voltage may be suitable over all line conditions (i.e., input voltages $V_{in}$) and during a short circuit.(i.e., $V_{out}$=0) to forward bias the synchronous rectifier $16_1$.

Turn-on of the synchronous rectifier $16_1$ may be accomplished by the switch $36_1$. During the interval where PWM1 is high, the node voltage $V_1$ is at $-V_{in}/N$. Thus, the gate-source voltage ($V_{gs}$) of the p-channel switch $36_1$ equals:

$$((V_{in}/N)+V_{out})-((2V_{in}/N)+V_{out}-(V_{in}/N))=0.$$

As such, the switch $36_1$ is in a non-conducting state. When PWM1 goes low, the voltage at node B of the converter 202 will be forced to $V_{out}$. As such, the gate-source voltage ($V_{gs}$) of the switch $36_1$ will be forced to $-V_{in}/N$. Thus, the switch $36_1$ will be in a conducting state and will transfer charge from the capacitor $210_1$ to the synchronous rectifier $16_1$, forcing the synchronous rectifier $16_1$ into the conducting third quadrant state. During the interval when PWM2 goes high, the switch $36_1$ is biased on to the entire charge pump level of $2(V_{in}+V_{out})$. Because the synchronous rectifier $16_1$ is already conductive, this has no effect in the conduction interval.

Turn-off and turn-on of the synchronous rectifier $16_2$ may be accomplished in an analogous manner and is, therefore, not further described herein.

Figure 7:
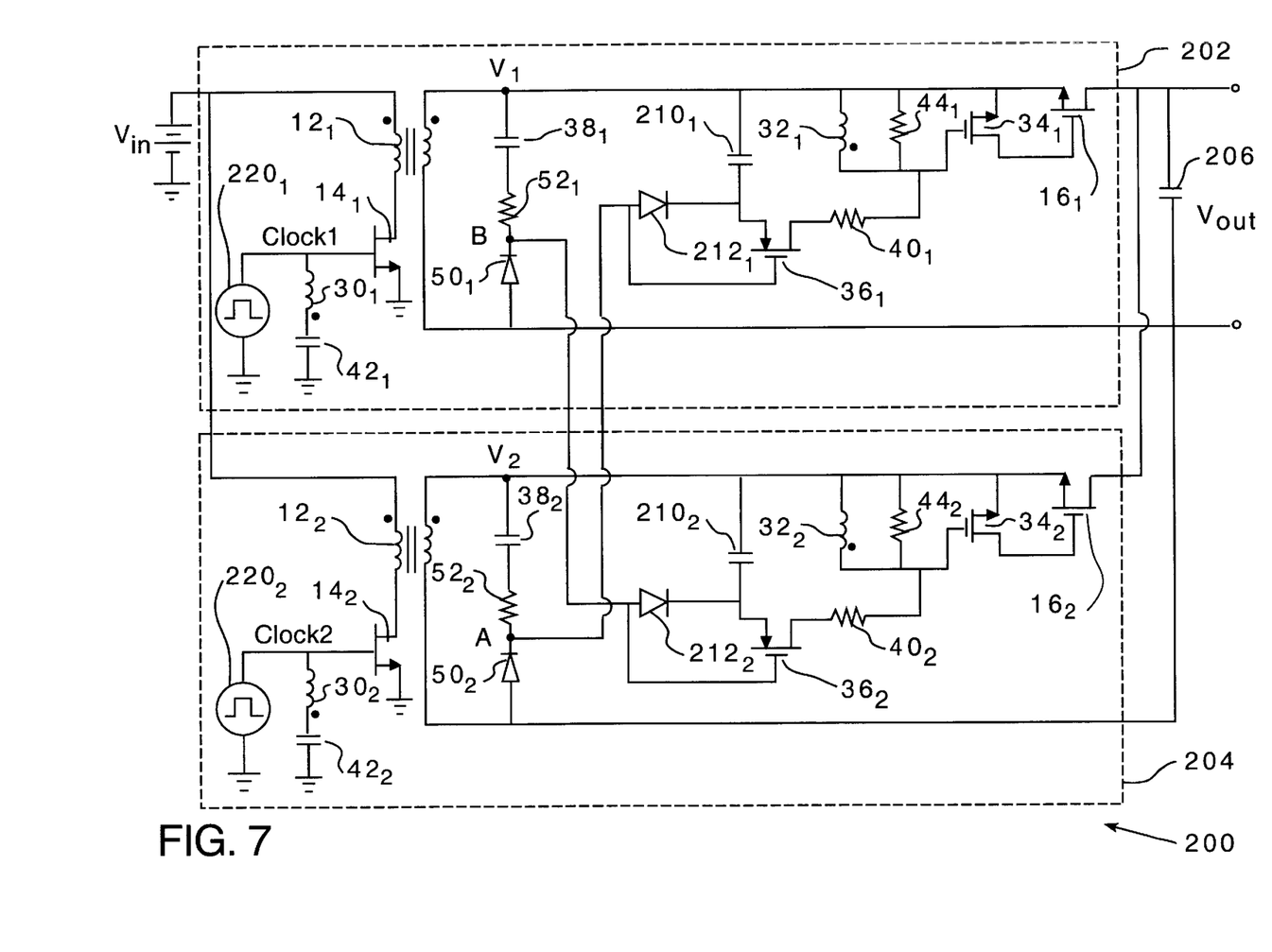
FIG. 7 is a schematic diagram of a power supply according to another embodiment of the present invention.

FIG. 7 is a diagram of the power supply 200 according to another embodiment of the present invention. The power supply 200 is similar to that of FIG. 5, except that the transformers $12_{1-2}$ are forward-mode transformers and that the drive signals to the primary power switches $16_{1-2}$ are supplied by first and second clock circuits $220_{1-2}$ respectively. The signals from the first and second clock circuits $220_{1-2}$ (CLOCK1 and CLOCK2) may be, for example, 180 degrees out of phase but with some overlapping high period. Thus, for the overlapping interval, both the transformers $12_{1-2}$ deliver energy to the output at the same time. In addition, for the power supply 200 of FIG. 7, the pulse transformer sense may be reversed (i.e., the polarities of the primary windings $30_{1-2}$ and the secondary windings $32_{1-2}$ of the pulse transformers are the same) since the transformers $12_{1-2}$ operate in the forward mode.

Figure 8:
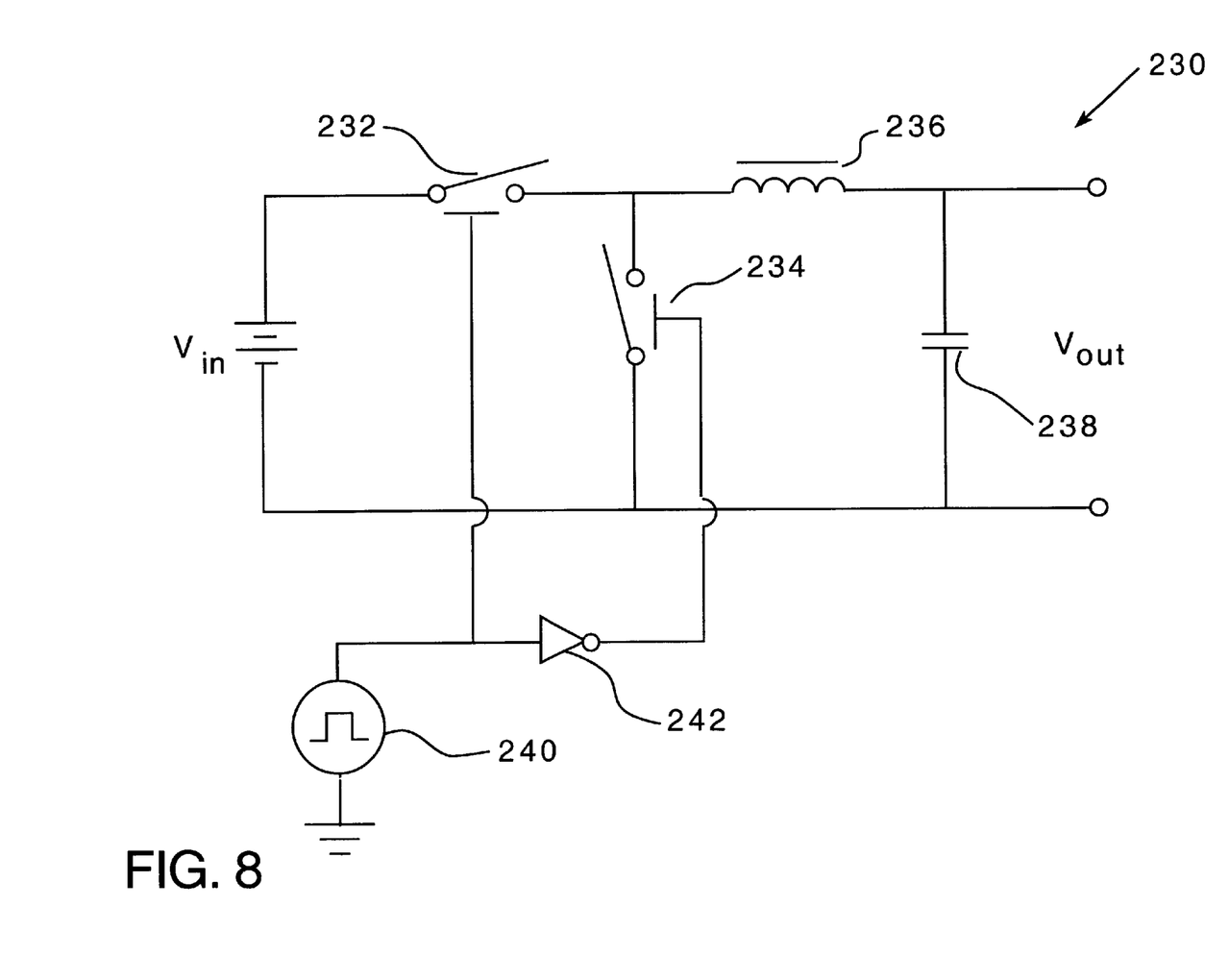
FIG. 8 is a schematic diagram of a synchronous buck converter that may be used in conjunction with the power supply of FIG. 7 according to one embodiment of the present invention.

According to one embodiment, the input voltage $V_{in}$ for the power supply 200 of FIG. 7 may be supplied by, for example, a synchronous buck converter, as illustrated in FIG. 8. The synchronous buck converter 230 of FIG. 8 includes two switches 232, 234, and inductor 236, and a capacitor 238. The switches 232, 234 may be, for example, transistors such as, for example, bipolar junction transistors or field effect transistors. The voltage across the capacitor 238 (Vout) may be the input voltage (Vin) for the power supply 200 of FIG. 7. The switches 232, 234 may be driven by PWM control circuit 240, which may be responsive to the output voltage Vout of the power supply 200 of FIG. 7, to thereby regulate the output voltage of the power supply 200. An inverter 242 may be connected between the PWM control circuit 240 and the switch 234 such that the switches 232, 234 are oppositely driven.

Although the present invention has been described herein with respect to certain embodiments, those of ordinary skill in the art will recognize that many modifications and variations of the present invention may be implemented. For example, the isolation transformer 12 may include multiple primary, secondary, or tertiary windings. In addition, the power converter circuit 10 may include an active clamp circuit coupled to one of, for example, the primary, secondary, or tertiary windings. The foregoing description and the following claims are intended to cover all such modifications and variations.

What is claimed is:

1. A dual output power converter, comprising:

a transformer having first and second secondary windings;

a first synchronous rectifier coupled to the first secondary winding of the transformer for converting a first alternating voltage at the first secondary winding to a first DC output voltage;

a second synchronous rectifier coupled to the second secondary winding of the transformer for converting a second alternating voltage at the second secondary winding to a second DC output voltage; and a drive circuit coupled to each of the first and second synchronous rectifiers for turning on the first and second synchronous rectifiers when the first alternating voltage at the first secondary winding and the second alternating voltage at the second secondary winding transition from a first polarity to a second polarity, and for turning off the first and second synchronous rectifiers when the first alternating voltage at the first secondary winding and the second alternating voltage at the second secondary winding transition from the second polarity to the first polarity, wherein the drive circuit includes a first switch coupled to the first and second synchronous rectifiers and a second switch coupled to at least one of the first and second synchronous rectifiers.

2. The power converter of claim 1, wherein:

the first switch is for supplying a drive current to a control terminal of each of the first and second synchronous rectifiers when the first alternating voltage at the first secondary winding and the second alternating voltage at the second secondary winding are at the second polarity; and the second switch is for shunting the drive current from the control terminals of the first and second synchronous rectifiers when the first alternating voltage at the first secondary winding and the second alternating voltage at the second secondary winding transition from the second polarity to the first polarity.

3. The power converter of claim 2, wherein the drive circuit further includes a pulse transformer having first and secondary windings for turning on the second switch when the first alternating voltage at the first secondary winding and the second alternating voltage at the second secondary winding transition from the second polarity to the first polarity.

4. The power converter of claim 3, wherein the drive circuit further includes a differentiator circuit coupled to the pulse transformer.

5. The power converter of claim 4, wherein the differentiator circuit includes:

a capacitor connected to the primary winding of the pulse transformer; and a resistor connected in parallel with the primary winding of pulse transformer.

6. The power converter of claim 1, wherein:

the first synchronous rectifier includes a MOSFET; and the second synchronous rectifier includes a MOSFET.

7. A dual output power converter, comprising:

a transformer having first and second secondary windings;

a first synchronous rectifier coupled to the first secondary winding of the transformer;

a second synchronous rectifier coupled to the second secondary winding of the transformer; and a drive circuit coupled to each of the first and second synchronous rectifiers;

wherein the drive circuit includes a first switch coupled to the first and second synchronous rectifiers and a second switch coupled to at least one of the first and second synchronous rectifiers, and wherein the first switch is for supplying a drive current to a control terminal of each of the first and second synchronous rectifiers and the second switch is for shunting the drive current from the control terminals of the first and second synchronous rectifiers.

8. The power converter of claim 7, wherein:

the first switch is for supplying the drive current when a first alternating voltage at the first secondary winding and a second alternating voltage at the second secondary winding is at a first polarity; and the second switch is for shunting the drive current when the first alternating voltage at the first secondary winding and the second alternating voltage at the second secondary winding transition from the first polarity to a second polarity.

9. The power converter of claim 8, wherein the drive circuit further includes a pulse transformer having first and secondary windings for turning on the second switch when the first alternating voltage at the first secondary winding and the second alternating voltage at the second secondary winding transition from the first polarity to the second polarity.

10. The power converter of claim 9, wherein the drive circuit further includes a differentiator circuit coupled to the pulse transformer.

11. The power converter of claim 10, wherein the differentiator circuit includes:

a capacitor connected in series with the primary winding of the pulse transformer; and a resistor connected in parallel with the pulse transformer.

12. The power converter of claim 7, wherein:

the first synchronous rectifier includes a MOSFET; and the second synchronous rectifier includes a MOSFET.

* * * * *